Patented Dec. 12, 1939

2,183,036

UNITED STATES PATENT OFFICE

2,183,036

PROCESS OF FORMING AN ALDEHYDE AND AN OLEFIN MONOHALIDE

James Lawrence Amos, Midland, Mich., assignor to The Dow Chemical Company, Midland, Mich., a corporation of Michigan No Drawing. Application December 24, 1936, Serial No. 117,579

2 Claims. (Cl. 260—601)

This invention relates to an improved process for the concurrent production from an olefin halide of the corresponding aldehyde and monohalo-olefin. The term "olefin halide" is employed herein to designate compounds of the type:

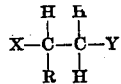

wherein R represents hydrogen or an alkyl radical, and X and Y each represent the same, or a different, halogen.

An object of the invention is to provide a process whereby an olefin halide can be converted almost entirely to the corresponding aldehyde and monohalo-olefin. A further object of the invention is to provide a way of regulating the simultaneous cracking and hydrolysis of an olefin halide so that either the aldehyde or the halo-olefin may be obtained in major proportion, as desired. A particular object of the invention is to provide a process for the concurrent production in a good yield of acetaldehyde and vinyl chloride from ethylene chloride.

I have now found that the corresponding aldehydes and monohalo-olefins can be obtained in good yield by treating an olefin halide, or mixtures of such halides, with steam in the presence of a surface catalyst, such as activated alumina, under suitable conditions of temperature. The method which I prefer to employ in carrying out the preparation of an aldehyde and a halo-olefin comprises: mixing the olefin halide, preferably in the vapor phase, with superheated steam supplied in amount and at a temperature sufficiently high to produce in the resulting gaseous mixture a temperature within the range desired, substantially all of the heat being supplied by the steam; conducting the hot gaseous reaction mixture from the mixing zone through a catalyst contact zone; and passing the products of reaction therefrom into a suitable condensing system.

The proportion of steam to be mixed with the olefin halide vapor is generally in excess of such vapor. Relatively high ratios of steam to olefin halide result in the best conversion of halide to the corresponding aldehyde and monohalo-olefin. In my experimental work, I have used ratios between 1.3 and 8.1 parts by weight of steam per part of olefin halide. Sufficient steam of the proper temperature is to be used so that the temperature of the steam-olefin halide mixture in the catalyst zone is between about 300° C. and the decomposition temperature of the aldehyde or monohalo-olefin products. In general, the temperature in said zone should be between about 300° C. and about 800° C.; and, more particularly, between about 350° C. and about 650° C. Other surface catalysts suitable for use in the method of the invention are kaolin, activated carbon, fuller's earth, bleaching earths, kieselguhr, bentonite, tonsil, pumice, diatomaceous earth, silica gel, calcium carbonate, magnesium oxide, other argillaceous or siliceous materials, and mixtures of the foregoing.

The following examples illustrate the practice of my invention:

Example 1

Ethylene chloride vapor and superheated steam, in the ratio of 7.1 parts by weight of steam per part of ethylene chloride, were introduced simultaneously into a mixing chamber, the steam having a sufficiently high superheat to produce in the gaseous mixture a temperature of about 440° C. This mixture was led over a catalyst body consisting of activated alumina, maintained by the hot gases at a temperature of about 440° C., and the liquefiable products were thereafter condensed. On distillation of the condensate from 100 parts by weight of ethylene chloride passed once through the system, there was obtained 70 parts of unchanged ethylene chloride, 7.6 parts of acetaldehyde, 7.6 parts of vinyl chloride, and a small amount of ethyl chloride. Based on the ethylene chloride reacted, this represents a yield of 57.4 per cent acetaldehyde and 40 per cent vinyl chloride.

Example 2

Another experiment was carried out similarly as in the preceding example, with a mixing zone temperature of approximately 410° C., using ethylene chloride and steam in a ratio of 2.9 parts by weight of the latter to one part of the former, which resulted in a yield of 45.5 per cent of acetaldehyde and 44.7 per cent of vinyl chloride, based on the amount of ethylene chloride reacted.

Examples of the other dihalides are propylene chloride and 1,2 dichlorobutane.

The relative proportions of aldehyde and monohalo-olefin produced according to my process can be varied by controlling the temperature in the catalyst zone and the ratio of steam to olefin halide. Higher temperatures accompanied by low ratios of steam to olefin halide produce a larger proportion of vinyl chloride in the product, while larger ratios of steam to olefin halide tend to give higher proportions of aldehyde. When operating at temperatures above 650° C., and even at temperatures near 800° C., I have been able to produce monohalo-olefins and aldehydes without the apparent production of hydrocarbons of the acetylene series.

If it is desired to increase the proportion of aldehyde in the product, over that heretofore described, from a given quantity of olefin halide, this can be done by returning to the reaction system the monohalo-olefin initially formed as one of the products of the reaction. For instance, in the preparation of acetaldehyde and vinyl chloride from ethylene chloride, the vinyl chloride formed may be separated from the condensed product and added to the starting materials of a subsequent run, wherein the mass action effect, or the hydrolysis, of the added vinyl chloride represses the formation of vinyl chloride from ethylene chloride and correspondingly increases the yield of acetaldehyde.

The above examples represent the results obtained at a single pass of the materials through the process. In a continuous mode of operation the unreacted ethylene chloride recovered in the product can be separated and returned to the process along with sufficient additional ethylene chloride to make up for that previously consumed. Such procedure can also be combined with the return of vinyl chloride to the process as already described for controlling the further formation of vinyl chloride. In such case the vinyl chloride and ethylene chloride are both separated from the reaction product and continuously recycled in the process.

The present process is also applicable to the cracking and hydrolysis of olefin bromides or of olefin-chlorobromides, in which compounds the halogen atoms are in the 1,2-positions. It may be applied likewise to the production of mixed aldehydes and mixed monohalo-olefins from mixtures of olefin halides.

Other modes of applying the principle of my invention may be employed instead of those explained, change being made as regards the method herein disclosed, provided the step or steps stated by any of the following claims, or the equivalent of such stated step or steps be employed.

I, therefore, particularly point out and distinctly claim as my invention:

1. The process for converting a 1,2-olefin-dihalide substantially only to the corresponding aldehyde and monohalo-olefin, which comprises mixing one part by weight of said dihalide with between about 1.3 and about 8.1 parts by weight of steam superheated to an extent sufficient to produce in the resulting gaseous mixture a temperature between about 300° and about 800° C., passing said gaseous mixture over a surface catalyst while at a temperature in said range, and separating the aldehyde and monohalo-olefin from the product thus formed.

2. The process for converting ethylene chloride substantially only to acetaldehyde and vinyl chloride, which comprises mixing one part by weight of ethylene dichloride with between about 1.3 and about 8.1 parts by weight of steam superheated to an extent sufficient to produce in the resulting gaseous mixture a temperature between about 350° and about 650° C., passing said gaseous mixture over a surface catalyst while at a temperature in the said range, and separating acetaldehyde and vinyl chloride from the product thus formed.

JAMES LAWRENCE AMOS.